United States Patent
Marriott et al.

(10) Patent No.: US 8,798,891 B2
(45) Date of Patent: Aug. 5, 2014

(54) SYSTEM AND METHOD FOR INCREASING OPERATING EFFICIENCY OF A HYBRID VEHICLE

(75) Inventors: Craig D. Marriott, Clawson, MI (US); Ben W. Moscherosch, Waterford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 245 days.

(21) Appl. No.: 13/177,094

(22) Filed: Jul. 6, 2011

(65) Prior Publication Data
US 2013/0013136 A1 Jan. 10, 2013

(51) Int. Cl.
*G06F 19/00* (2011.01)
*F02D 13/00* (2006.01)

(52) U.S. Cl.
USPC ............... 701/101; 701/22; 701/99; 701/103; 701/104; 701/105; 701/112; 123/345; 123/346

(58) Field of Classification Search
CPC . B60W 10/06; B60W 20/00; B60W 2540/10; B60W 2540/12; B60W 30/18127; F02D 2041/001; F02D 13/0203; F02D 13/0207; F02D 13/0211; F02D 13/0226; F02D 13/0253; F02D 41/0002; F02D 41/042; F02D 41/123; F02D 2250/21
USPC ............ 701/22, 99, 101, 103, 104, 105, 112; 123/90.15, 90.16, 90.17, 90.18, 321; 123/322, 325, 332, 333, 345, 346
See application file for complete search history.

(56) References Cited

U.S. PATENT DOCUMENTS

| | | | |
|---|---|---|---|
| 6,173,569 B1 * | 1/2001 | Kusada et al. ................... 60/277 |
| 6,519,513 B2 * | 2/2003 | Nakagawa et al. ............. 701/22 |
| 6,595,307 B2 * | 7/2003 | Suzuki ....................... 180/65.235 |
| 6,694,232 B2 * | 2/2004 | Saito et al. ....................... 701/22 |
| 6,763,298 B2 * | 7/2004 | Boggs et al. ................... 701/112 |
| 7,287,513 B2 * | 10/2007 | Morin ........................... 123/432 |
| 7,317,984 B2 * | 1/2008 | Lewis ............................ 701/112 |
| 7,353,106 B2 * | 4/2008 | Kolmanovsky et al. ...... 701/112 |
| 7,532,972 B2 * | 5/2009 | Kolmanovsky et al. ...... 701/105 |
| 7,597,164 B2 * | 10/2009 | Severinsky et al. ........ 180/65.27 |
| 8,131,453 B2 * | 3/2012 | Ulrey et al. ................... 701/112 |
| 8,224,558 B2 * | 7/2012 | Katou et al. .................. 701/110 |
| 8,290,652 B2 * | 10/2012 | Niimi .............................. 701/22 |
| 8,355,860 B2 * | 1/2013 | Liu et al. ....................... 701/113 |
| 2002/0115532 A1 * | 8/2002 | Wakashiro et al. ........... 477/111 |
| 2004/0147364 A1 * | 7/2004 | Wakashiro et al. ............... 477/3 |
| 2006/0086546 A1 * | 4/2006 | Hu et al. ....................... 180/65.2 |
| 2009/0120390 A1 * | 5/2009 | Ezaki et al. ................. 123/90.15 |
| 2009/0152027 A1 * | 6/2009 | Kusaka et al. ............. 180/65.28 |
| 2009/0205889 A1 * | 8/2009 | Leone ....................... 180/65.265 |
| 2010/0038158 A1 * | 2/2010 | Whitney et al. .......... 180/65.265 |
| 2012/0022769 A1 * | 1/2012 | Nakagawa et al. ........... 701/103 |
| 2012/0130577 A1 * | 5/2012 | Ichimoto ........................ 701/22 |

* cited by examiner

*Primary Examiner* — Khoi Tran
*Assistant Examiner* — Robert Nguyen
(74) *Attorney, Agent, or Firm* — Quinn Law Group, PLLC

(57) ABSTRACT

A method is provided for controlling a hybrid electric vehicle that includes an internal combustion engine having a cylinder provided with an intake valve, an exhaust valve, and a piston configured to rotate the engine's crankshaft. The method includes determining whether deceleration of the vehicle is desired and also includes ceasing supply of fuel to the cylinder when such condition is satisfied. The method additionally includes selecting a fuel-off actuation arrangement for the intake valve via a mechanism configured to provide variable valve timing and lift, such that a magnitude of compression pulses in the cylinder during deceleration is limited. A system for controlling the hybrid vehicle and a vehicle employing such a system are also provided.

20 Claims, 3 Drawing Sheets

SYSTEM AND METHOD FOR INCREASING OPERATING EFFICIENCY OF A HYBRID VEHICLE

TECHNICAL FIELD

The present disclosure is drawn to a system and a method for increasing operating efficiency of a hybrid vehicle.

BACKGROUND

Among many uses for internal combustion engines, such engines are often employed for powering various vehicles, either as a primary power source, or as part of a hybrid powertrain. When an internal combustion engine is used in a hybrid powertrain, such an engine is combined with one or more electric motors to power the vehicle.

In order to maximize fuel efficiency of a hybrid vehicle, it is often desirable to shut the engine off and decouple it from the driven wheels when the vehicle is subject to deceleration. If, however, the powertrain is configured such that the engine may not be completely decoupled from the driven wheels, it is at least desirable to shut off the engine's supply of fuel, while permitting the engine to be motored or driven by the vehicle's inertia. When such a permanently coupled engine's fuel supply is shut off during vehicle deceleration, the engine continues to operate as an air pump which incurs spin and pumping losses and also increases engine braking. Generally, such losses reduce gains in fuel efficiency that may otherwise result from the engine being shut off. Additionally, such losses are likely to reduce the energy available to be recaptured by the powertrain's electric motor for recharging vehicle batteries.

SUMMARY

A method is provided for controlling a hybrid electric vehicle that includes an internal combustion engine having a cylinder provided with an intake valve, an exhaust valve, and a piston configured to rotate the engine's crankshaft. The method includes determining whether deceleration of the vehicle is desired and also includes ceasing supply of fuel to the cylinder when such condition is satisfied. The method additionally includes selecting a fuel-off actuation arrangement for the intake valve via a mechanism configured to provide variable valve timing and lift, such that a magnitude of compression pulses in the cylinder during deceleration is limited.

The exhaust valve may be in fluid communication with an exhaust system that includes a three-way catalyst. Accordingly, the act of selecting the fuel-off actuation arrangement for the intake valve may limit an amount of intake air that is forced into the three-way catalyst via the exhaust system.

The method may also include resuming supply of fuel to the cylinder when acceleration of the vehicle is desired. The act of resuming supply of fuel to the cylinder may include supplying a sufficient amount of fuel to consume the amount of intake air forced into the three-way catalyst.

The vehicle may include a controller. Consequently, the acts of determining whether a deceleration of the vehicle is desired, ceasing supply of fuel, selecting the fuel-off actuation arrangement for the intake valve, and resuming supply of fuel may be accomplished via the controller.

The act of selecting the fuel-off actuation arrangement for the intake valve may maximize the amount of energy recovered by the motor-generator to recharge the energy-storage system during vehicle deceleration.

The mechanism may include a camshaft having a first cam lobe and a second cam lobe. The mechanism may also include a rocker arm having a first surface configured to actuate the intake valve via the first cam lobe and generate a first valve lift profile, and a second surface configured to actuate the intake valve via the second cam lobe and generate a second valve lift profile. The mechanism may additionally include a device configured to select one of the first and second surfaces of the rocker arm to actuate the intake valve. Furthermore, the mechanism may include a phaser configured to select a predetermined fuel-off position for the camshaft when the supply of fuel to the engine has been ceased. In such a mechanism, the first lift profile may be lower than the second lift profile and the first camshaft position may be configured to open the intake valve earlier than the second camshaft position. Additionally, in such a case, the fuel-off actuation arrangement for the intake valve may be selected by rotating the camshaft to the fuel-off position and selecting the first cam lobe.

A system for controlling the above hybrid electric vehicle and a vehicle employing such a system are also provided. The system and the vehicle each include a controller that is configured to execute the aforementioned method.

The vehicle may include a brake pedal such that the controller may be additionally configured to monitor a position of the brake pedal to determine whether the deceleration of the vehicle is desired. Additionally, the controller may be configured to operate the mechanism to select a fuel-on actuation arrangement for the intake valve when the brake pedal is released.

The above features and advantages and other features and advantages of the present invention are readily apparent from the following detailed description of the best modes for carrying out the invention when taken in connection with the accompanying drawings.

DETAILED DESCRIPTION

Figure 1:
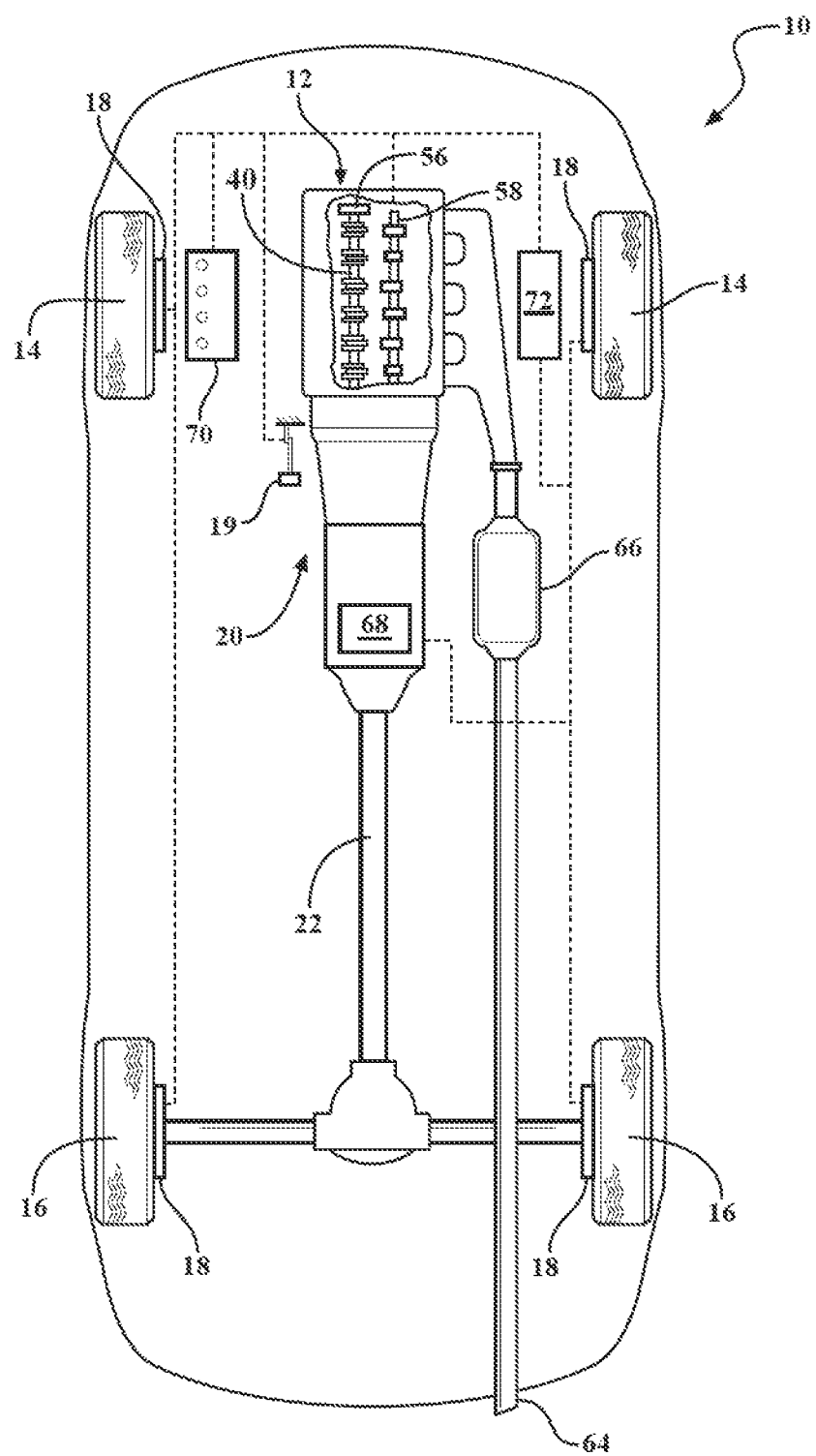
FIG. 1 is a schematic illustration of a hybrid electric vehicle including an internal combustion engine having a mechanism configured to provide variable valve timing and lift for the engine's intake valves.

Referring to the drawings, wherein like reference numbers refer to like components, FIG. 1 shows a schematic view of a hybrid electric vehicle (HEV) 10. The HEV 10 incorporates a powertrain that includes an internal combustion engine 12, such as a spark or a compression ignition type, adapted for driving wheels 14 and/or wheels 16 to propel the vehicle. Engine 12 may also be employed for engine braking, i.e., using the inertia of the HEV 10 to rotate the engine, thereby slowing the vehicle when the HEV is coasting down from elevated speed.

The hybrid vehicle 10 may also be slowed or retarded by a friction braking system that includes braking members 18. Braking members 18 are actuated by an operator of HEV 10 via a brake pedal 19 when vehicle deceleration is desired, such as during stop and go operation in city traffic or when the HEV otherwise gains speed while coasting downhill. Braking members 18 typically include components such as brake rotors, brake calipers and brake pads that are commonly hydraulically actuated, as known to those skilled in the art, and are not explicitly shown. Braking members 18 are configured to apply a frictional force to the wheels 14 and 16 for reducing speed of the HEV by dissipating the vehicle's kinetic energy as heat.

Figure 2:
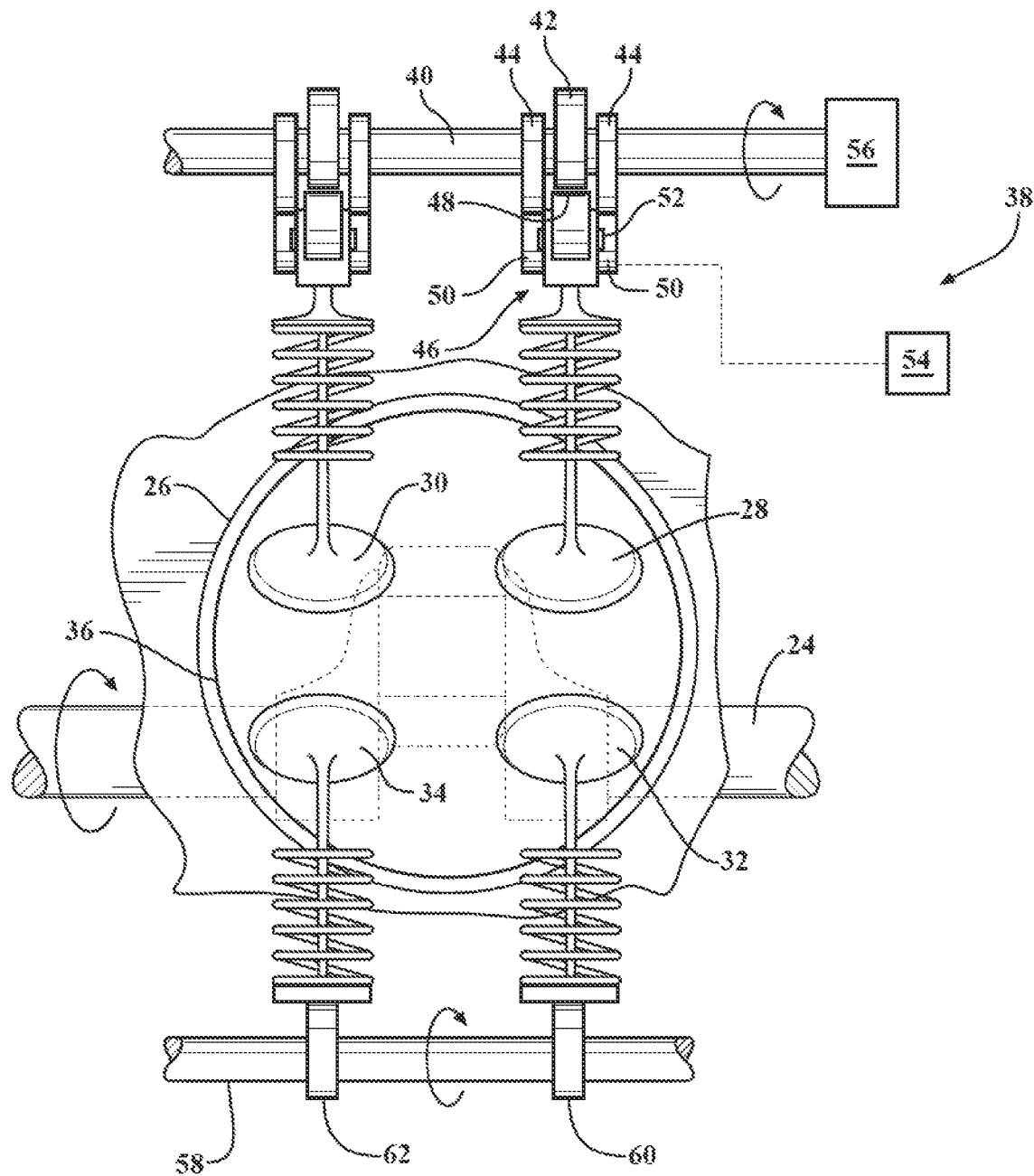
FIG. 2 is a schematic side view of a specific embodiment of the mechanism schematically depicted in FIG. 1.

The engine 12 applies its torque to the driven wheels 14 and/or 16 through a transmission 20 and via a drive or a propeller shaft 22. As shown in FIG. 2, the engine 12 includes a crankshaft 24 and cylinders 26. Each cylinder 26 is provided with a first intake valve 28, a second intake valve 30, a first exhaust valve 32, and a second exhaust valve 34. Each intake valve 28, 30 is configured to control a supply of air or of air and fuel into the respective cylinder 26 when the engine 12 is propelling the HEV 10. Each exhaust valve 32, 34 is configured to control the removal of post combustion exhaust gas from the respective cylinder 26. Each cylinder 26 also includes a piston 36 and a connecting rod that is not shown, but the existence of which would be appreciated by those skilled in the art.

As additionally shown in FIG. 2, each piston 36 is configured to reciprocate under the force of combustion inside the respective cylinder 26, and thereby rotate the crankshaft 24 via the connecting rod. As will be appreciated by those skilled in the art, exhaust emissions, fuel efficiency, and power output of the engine 12 may each be affected by the duration and lift of opening and closure of intake valves 28, 30 and exhaust valves 32, 34. Additionally, the same engine performance parameters are also affected by the timing of opening and closure of intake valves 28, 30 and exhaust valves 32, 34 relative to top and bottom dead center positions of the respective piston 36.

The engine 12 is configured to be shut off and motored by vehicle inertia during deceleration of the HEV 10 for improved fuel efficiency of the HEV, and then automatically restarted when acceleration of the HEV is again desired. To shut off the engine 12, a supply of fuel is ceased to be delivered to each cylinder 26, and is then resumed when the engine is to be restarted. Typically, when the fuel supply to an internal combustion engine is shut off and the engine is motored the internal rotating components, such as the crankshaft, valves, and pistons, of the subject engine remain in motion. Consequently, the cylinders of the motored engine continue to generate vacuum, and then draw in, compress, and pump out air. Accordingly, although the subject engine does not burn fuel or generate combustion forces, the engine does continue to experience spin and pumping losses. Such spin and pumping losses typically translate into reduced operating efficiency of the subject vehicle and counteract the improvement in fuel economy otherwise seen from shutting off the engine's fuel supply during deceleration.

To reduce spin and pumping losses in the engine 12 when the engine is being motored and to facilitate improved fuel efficiency when the engine is restarted, the engine additionally includes a mechanism 38. The mechanism 38 is operatively connected to the cylinders 26. Furthermore, the mechanism 38 is configured to provide variable valve timing and lift and select a fuel-off actuation arrangement for the intake valves 28, 30 when a supply of fuel to the cylinders 26 has been ceased during deceleration of the HEV 10.

As shown in FIG. 2, the mechanism includes 38 a camshaft 40 having a set of first cam lobes 42 and a set of second cam lobes 44. The mechanism 38 also includes a set of rocker arms 46. Each rocker arm 46 has a first surface 48 configured to actuate an individual intake valve 28 via the first cam lobe 42 and generate a first valve lift profile and a second surface 50 configured to actuate the intake valve 28 via the second cam lobe 44 and generate a second valve lift profile. To generate variable lift of the intake valve 28, the first surface 48 is fixed with respect to the camshaft 40, while the second surface 50 is moveable or adjustable relative to the camshaft. The first lift profile generated by the first surface 48 is lower than the second lift profile generated by the second surface 50. The mechanism 38 also includes a device 52 that is configured to select one of the first and second surfaces 48, 50 of the rocker arms 46 to actuate the intake valves 28.

The device 52 may be configured as a pin that is actuated by oil pressure. Such oil pressure may be regulated by an oil control valve 54, as shown in FIG. 2. Therefore, the device 52 selectively switches between the first cam lobes 42 and second cam lobes 44 to achieve the desired lift profile for the intake valve 28. Because, as shown, the engine 12 includes two intake valves 28 and 30 per each cylinder 26, the camshaft 40 also includes duplicate sets of first and second cam lobes 42, 44 to actuate the intake valves 30 via a duplicate set of rocker arms 46. Accordingly, intake valves 28 and 30 are actuated substantially synchronously, but by individual first and second cam lobes 42, 44 via individual rocker arms 46 to control supply of air or of air and fuel into the respective cylinder 26. Furthermore, the device 52 is also configured to select one of the first and second surfaces 48, 50 of the rocker arms 46 to generate substantially synchronously a desired lift profile for both intake valves 28 and 30.

With continued reference to FIG. 2, the mechanism 38 also includes a phaser 56. The phaser 56 provides engine 12 with control over the timing of opening and closing of the engine's intake valves 28, 30, i.e., variable valve timing, by varying the position of the camshaft 40 relative to the crankshaft 24. The phaser 56 may be operated, for example, by oil pressure, such that hydraulic force of the oil is employed for shifting the position of the camshaft 40 relative to the crankshaft 24, thereby varying the timing of opening and closure of the engine's valves. The phaser 56 may be generally configured to select a predetermined fuel-off position for the camshaft 40 when the supply of fuel to the engine 12 has been ceased. Accordingly, the fuel-off position of the phaser 56 shifts the camshaft 40 relative to the crankshaft 24, and relative to the position of the pistons 36, such that the intake valves 28, 30 remain open during the compression stroke longer than they would during the fuel-on positions of the phaser. The fuel-on positions of the phaser 56 are generally those where the intake valves 28, 30 are operated sufficiently to provide the engine 12 with the performance requested by an operator of the HEV 10.

The effective result of the fuel-off position of phaser 56 is that a magnitude of engine compression pulses is reduced or limited and manifold absolute pressure is increased when the supply of fuel has been ceased, as compared to when the engine 12 is being fueled. Accordingly, the fuel-off actuation arrangement for the intake valves 28, 30 is selected via the mechanism 38 by collectively rotating the camshaft 40 to the fuel-off position and selecting the first cam lobe 42. As such, the fuel-off actuation arrangement for the intake valves 28, 30 advances the closing of the intake valves relative to the position of the crankshaft 24 in comparison to fuel-on positions of the intake valves.

As shown in FIG. 2, the engine 12 also includes an exhaust camshaft 58. The exhaust camshaft 58 includes a set of third camshaft lobes 60 that is configured to regulate operation of the first exhaust valves 32. Additionally, the exhaust camshaft 58 includes a set of fourth camshaft lobes 62 configured to regulate operation of the second exhaust valves 34. Accordingly, the exhaust camshaft 58 operates the first and second exhaust valves 32, 34 to facilitate the removal of post combustion exhaust gas from the respective cylinder 26.

With renewed reference to FIG. 1, during fueled operation, the engine 12 emits gases that are a product of the combustion process through the first and second exhaust valves 32, 34, into an exhaust system 64, and out to the atmosphere. The exhaust system 64 includes a three-way catalytic converter 66 that is employed to reduce toxicity of the emitted exhaust gases, i.e., exhaust emissions, prior to the gases entering the atmosphere. The three-way catalytic converter 66 has three simultaneous tasks: 1) reduction of nitrogen oxides or $NO_x$ to nitrogen and oxygen, 2) oxidation of carbon monoxide to carbon dioxide, and 3) oxidation of unburned hydrocarbons to carbon dioxide and water.

When the air-fuel mixture entering the cylinders is within a narrow fuel/air ratio band surrounding stoichiometry, conversion of all three pollutants within the three-way catalytic converter 66 is nearly complete. However, outside that band conversion efficiency of the three-way catalytic converter 66 falls off rapidly. When there is more oxygen in the air-fuel mixture, and subsequently in the exhaust gases, than required, incomplete reduction of $NO_x$ may result. When the supply of fuel is ceased under deceleration of the HEV 10, the engine 12 is operated as an air pump, which leads to the three-way catalytic converter 66 being saturated with oxygen. Upon restart of the engine 12, a proportionate amount of fuel needs to be supplied into the exhaust system 64 to compensate for and consume the amount of air that has been forced into the three-way catalytic converter 66.

The fuel-off actuation arrangement for the intake valves 28, 30 generated when the mechanism 38 rotates the camshaft 40 to the fuel-off position and selects the first cam lobe 42 limits the amount of intake air that is forced into the three-way catalyst 66 under un-fueled deceleration of HEV 10. The amount of intake air that is thus forced into the three-way catalyst 66 is reduced compared to the amount of air that would be forced into the catalyst if the closing of the intake valves 28, 30 was delayed or retarded relative to the crankshaft 24 via selection of the second cam lobe 44 and having the phaser 56 assume a fuel-on positions. Accordingly, by reducing the amount of oxygen that is forced into the three-way catalytic converter 66, the mechanism 38 permits a proportionately smaller amount of fuel to be to be supplied to the cylinders 26 upon restart of the engine 12, thus facilitating improved fuel efficiency of the engine.

As shown in FIG. 1, the powertrain of HEV 10 additionally incorporates a motor-generator 68. As shown, the motor-generator 68 is positioned within the transmission 20, but may also be positioned anywhere in the HEV 10, depending on the vehicle architecture and control of the power flow. The HEV 10 is capable of being propelled by the motor-generator 68 alone, or in combination with the engine 12. The motor-generator 68 is configured to receive energy from and supply energy to an energy-storage system 70, such as one or more rechargeable battery modules. The energy-storage system 70 supplies electrical energy for cranking and starting the engine 12, the motor-generator 68, and miscellaneous vehicle accessories, e.g., vehicle heating and ventilation system, and exterior and interior lighting. The energy-storage system 70 is configured to selectively store energy up to a maximum allowable state of charge (SOC), and release the stored energy down to a specified minimum SOC.

In addition to the frictional braking via the braking members 18, for deceleration the HEV 10 may employ the regenerative braking mentioned above. Regenerative braking is a mechanism that is typically included in hybrid vehicles to decelerate the vehicle by converting some of the vehicle's kinetic energy into a storable form of energy instead of dissipating it as heat. In regenerative braking, the inertia of the HEV 10 is used to drive the motor-generator 68 thus causing the driven motor-generator to generate electrical current. Meanwhile, such driving of the motor-generator 68 additionally generates negative output torque from the transmission 20 which acts to slow the vehicle when the HEV 10 is coasting down from elevated speed. Regenerative braking typically provides a lower rate of deceleration of a subject vehicle than does the more common frictional braking accomplished via the braking members 18. It may therefore be desirable to retain engine braking while the engine 12 is shut off during regenerative braking to aid with the deceleration of the HEV 10.

The storable energy from regenerative braking is typically channeled to the energy-storage system 70 via the motor-generator 68 to restore its depleted SOC. Because regenerative braking recaptures otherwise lost energy, it may provide a more efficient mode of vehicle retardation than braking via the members 18 of the friction braking system. Because the engine 12 is not needed to power HEV 10 during regenerative braking, fuel delivery to the engine 12 may be cut off, thus additionally improving vehicle efficiency. By selecting the fuel-off actuation arrangement for the intake valves 28, 30 via the mechanism 38, which advances the closing of the intake valves relative to the crankshaft 24, the pumping losses of the engine 12 are reduced. Such reduced pumping losses decrease the amount of inertial energy absorbed by spinning the engine 12 during deceleration of the HEV 10. Accordingly, the operation of the mechanism 38 permits vehicle inertia to drive the motor-generator 68 more effectively to increase the amount of energy recovered by the motor-generator 68 for recharging the energy-storage system 70 during vehicle deceleration.

With continued reference to FIG. 1, the HEV 10 also includes a controller 72 configured to regulate the operation of the engine 12, the motor-generator 68, the transmission 20, and the members 18 of the friction braking system. The controller 72 is also configured to monitor the SOC of the energy-storage system 70. The controller 72 is additionally configured to determine whether a deceleration of the HEV 10 is desired and cease supply of fuel to cylinders 26 when such a condition is satisfied. Furthermore, the controller 72 is configured to operate the mechanism 38 to select the fuel-off actuation arrangement for the intake valves 28, 30 when the fuel supply to the cylinders 26 is cut off. Accordingly, the controller 72 is configured to limit the magnitude of compression pulses in the cylinders 26 and increase manifold absolute pressure when fuel supply is ceased during deceleration as compared to when the cylinders are being fueled.

The controller 72 includes memory which is tangible/non-transitory. The memory may be any recordable medium that participates in providing computer-readable data or process instructions. Such a medium may take many forms, including but not limited to non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Memory of the controller 72 may also include a floppy disk, a flexible disk, hard disk, magnetic tape, any other magnetic medium, a CD-ROM, DVD, any other optical medium, etc.

The controller 72 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the server 72 or accessible thereby may be stored in the memory and automatically executed to provide the required functionality.

The controller 72 may also be configured to determine whether a deceleration of HEV 10 is desired by the vehicle's operator via monitoring a position of the brake pedal 19. When it is determined that the deceleration of HEV 10 is desired, supply of fuel to engine 12 is regulated and ceased by the controller 72. When deceleration of HEV 10 is no longer desired, such as when the brake pedal 19 is released, the controller 72 may regulate the mechanism 38 back to the fuel-on position where the intake valves 28, 30 are controlled according to engine performance requested by the HEV's operator. Furthermore, following regulating the mechanism 38 back to the fuel-on position, the controller 72 may additionally resume supply of fuel to the engine 12. Thus resumed by the controller 72, the supply of fuel delivered to the cylinder 26 would be sufficient to consume the amount of intake air actually forced into the three-way catalyst 66 during deceleration of the HEV 10.

Figure 3:
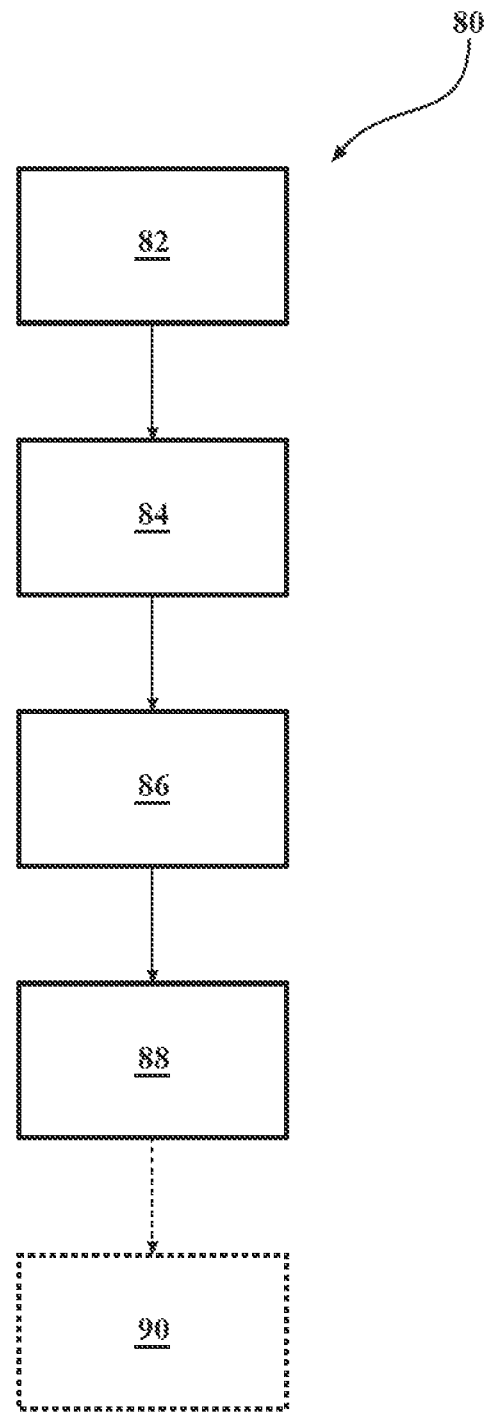
FIG. 3 is a flow diagram of a method of controlling the hybrid electric vehicle of FIG. 1.

FIG. 3 depicts a method 80 for controlling the HEV 10 described above with respect to FIGS. 1 and 2. The method commences in frame 82 with the HEV 10 progressing down the road at a measurable velocity. The method then proceeds from frame 82 to frame 84 for determining by the controller 72 whether deceleration of the HEV 10 is desired. Following frame 84, in frame 86 the method includes ceasing by the controller 72 a supply of fuel to engine 12 when such deceleration is desired. Following the ceasing of the fuel supply to the engine 12 in frame 86, the method proceeds to frame 88.

In frame 88, the method includes selecting the fuel-off actuation arrangement for the intake valves 28, 30 via the mechanism 38 such that the magnitude of compression pulses in the cylinders 26 is limited during deceleration when the fuel supply to the cylinders has been ceased. As described with respect to FIGS. 1-2, the mechanism 38 is configured to provide variable valve timing and lift. Accordingly, the mechanism 38 may include rocker arms 46 configured to variably control lift profiles of the intake valves 28, 30 working in conjunction with the phaser 56 configured to control the timing of opening and closing of the intake valves.

As a result, the selection of the fuel-off actuation arrangement by the mechanism 38 reduces pumping losses in the engine 12 as compared to the losses that are typically incurred during fuel-on operation of the intake valves 28, 30. Additionally, the selection of the fuel-off actuation arrangement by the mechanism 38 permits vehicle inertia to drive the motor-generator 68 more effectively to increase the amount of energy recovered by the motor-generator 68 for recharging the energy-storage system 70 during vehicle deceleration. Furthermore, the selection of the fuel-off actuation arrangement by the mechanism 38 reduces the amount of oxygen that is forced into the three-way catalytic converter 66. Such a reduction of the amount of oxygen pumped into the three-way catalytic converter 66 permits a proportionately smaller amount of fuel to be to be supplied to the cylinders 26 upon restart of the engine 12 and facilitates improved fuel efficiency of the engine.

According to the method, the controller 72 may also monitor position of the brake pedal 19 as an indicator of whether or not the vehicle operator desires to reduce speed of HEV 10. Furthermore, the controller 72 may regulate the mechanism 38 to the predetermined fuel-on position when the brake pedal 19 is released. Additionally, the supply of fuel to engine 12 may be resumed via the controller 72 in frame 90 when the brake pedal 19 has been released thus indicating that deceleration of the vehicle is no longer desired. Method 80 may also be applied during regenerative braking of HEV 10, when the motor-generator 68 is driven in generator mode to recharge the energy-storage system 70.

While the best modes for carrying out the invention have been described in detail, those familiar with the art to which this invention relates will recognize various alternative designs and embodiments for practicing the invention within the scope of the appended claims.

The invention claimed is:

1. A method of controlling a hybrid electric vehicle having an internal combustion engine including a crankshaft, a cylinder provided with an intake valve and a piston configured to reciprocate inside the cylinder and rotate the crankshaft, the method comprising:
   determining whether a deceleration of the vehicle is desired;
   ceasing supply of fuel to the cylinder when the deceleration is desired; and
   selecting a fuel-off actuation arrangement for the intake valve via a mechanism configured to provide variable valve timing and lift, such that an amount of lift for the intake valve when the supply of fuel has been ceased is lower than before the supply of fuel has been ceased and a magnitude of compression pulses in the cylinder during deceleration is limited thereby.

2. The method of claim 1, wherein the engine additionally includes an exhaust valve in fluid communication with an exhaust system that includes a three-way catalyst, and wherein said selecting the fuel-off actuation arrangement for the intake valve limits an amount of intake air that is forced into the three-way catalyst via the exhaust system.

3. The method of claim 1, further comprising resuming supply of fuel to the cylinder when acceleration of the vehicle is desired.

4. The method of claim 3, wherein said resuming supply of fuel to the cylinder includes supplying a sufficient amount of fuel to consume the amount of intake air forced into the three-way catalyst.

5. The method of claim 3, wherein the vehicle includes a controller, and wherein each of said determining whether a deceleration of the vehicle is desired, ceasing supply of fuel, selecting the fuel-off actuation arrangement for the intake valve, and resuming supply of fuel is accomplished via the controller.

6. The method of claim 1, the vehicle additionally having a motor-generator and an energy-storage system operatively connected to the engine and to the motor-generator, wherein said selecting the fuel-off actuation arrangement for the intake valve increases an amount of energy recovered by the motor-generator to recharge the energy-storage system during vehicle deceleration.

7. The method of claim 1, wherein the mechanism includes:
   a camshaft having a first cam lobe and a second cam lobe;
   a rocker arm having a first surface configured to actuate the intake valve via the first cam lobe and generate a first valve lift profile and a second surface configured to actuate the intake valve via the second cam lobe and generate a second valve lift profile;
   a device configured to select one of the first and second surfaces of the rocker arm to actuate the intake valve; and
   a phaser configured to select a predetermined fuel-off position for the camshaft when the supply of fuel to the engine has been ceased;

wherein:
the first lift profile is lower than the second lift profile; and
the fuel-off actuation arrangement for the intake valve is selected by rotating the camshaft to the fuel-off position and selecting the first cam lobe.

8. A system for controlling a hybrid electric vehicle, the system comprising:
an intake valve configured to control supply of air into a cylinder of an internal combustion engine of the vehicle;
a mechanism operatively connected to the cylinder and configured to provide variable valve timing and lift and select a fuel-off actuation arrangement for the intake valve when a supply of fuel to the cylinder has been ceased, wherein the fuel-off actuation arrangement includes an amount of lift for the intake valve that is lower when the supply of fuel has been ceased than before the supply of fuel has been ceased; and
a controller configured to:
determine whether a deceleration of the vehicle is desired;
cease supply of fuel to the cylinder when the deceleration is desired; and
operate the mechanism to select the fuel-off actuation arrangement for the intake valve such that a magnitude of compression pulses in the cylinder during deceleration is limited.

9. The system of claim 8, wherein the engine additionally includes an exhaust valve in fluid communication with an exhaust system that includes a three-way catalyst, and wherein an amount of intake air that is forced into the three-way catalyst via the exhaust system is limited when the fuel-off actuation arrangement for the intake valve is selected.

10. The system of claim 8, wherein the controller is additionally configured to resume supply of fuel to the cylinder when acceleration of the vehicle is desired.

11. The system of claim 10, wherein the resumed supply of fuel to the cylinder includes a sufficient amount of fuel to consume the amount of intake air forced into the three-way catalyst.

12. The system of claim 8, wherein the vehicle additionally includes a motor-generator and an energy-storage system operatively connected to the engine and to the motor-generator, and wherein the fuel-off actuation arrangement being selected for the intake valve increases amount of energy recovered by the motor-generator to recharge the energy-storage system during vehicle deceleration.

13. The system of claim 8, wherein the mechanism includes:
a camshaft having a first cam lobe and a second cam lobe;
a rocker arm having a first surface configured to actuate the intake valve via the first cam lobe and generate a first valve lift profile and a second surface configured to actuate the intake valve via the second cam lobe and generate a second valve lift profile;
a device configured to select one of the first and second surfaces of the rocker arm to actuate the intake valve; and
a phaser configured to select a predetermined fuel-off position for the camshaft when the supply of fuel to the engine has been ceased;
wherein:
the first lift profile is lower than the second lift profile; and
the fuel-off actuation arrangement for the intake valve is selected by rotating the camshaft to the fuel-off position and selecting the first cam lobe.

14. A hybrid electric vehicle comprising:
an internal combustion engine configured to power the vehicle, the engine including:
a crankshaft;
a cylinder provided with a first intake valve, a second intake valve, and an exhaust valve, wherein each intake valve is configured to control supply of air into the cylinder and the exhaust valve is configured to control the removal of exhaust gas from the cylinder;
a piston configured to reciprocate inside the cylinder and rotate the crankshaft; and
a mechanism operatively connected to the cylinder and configured to provide variable valve timing and lift and select a fuel-off actuation arrangement for the intake valve when a supply of fuel to the cylinder has been ceased, wherein the fuel-off actuation arrangement includes an amount of lift for the intake valve that is lower when the supply of fuel has been ceased than before the supply of fuel has been ceased; and
a controller configured to:
determine whether a deceleration of the vehicle is desired;
cease supply of fuel to the cylinder when the deceleration is desired; and
operate the mechanism to select the fuel-off actuation arrangement for the intake valve such that a magnitude of compression pulses in the cylinder during deceleration is limited.

15. The vehicle of claim 14, further comprising an exhaust system that includes a three-way catalyst, wherein:
the exhaust valve is in fluid communication with the exhaust system; and
an amount of intake air that is forced into the three-way catalyst via the exhaust system is limited when the fuel-off actuation arrangement for the intake valve is selected.

16. The vehicle of claim 14, wherein the controller is additionally configured to resume supply of fuel to the cylinder when acceleration of the vehicle is desired.

17. The vehicle of claim 16, wherein the resumed supply of fuel to the cylinder includes a sufficient amount of fuel to consume the amount of intake air forced into the three-way catalyst.

18. The vehicle of claim 14, wherein the vehicle additionally includes a motor-generator and an energy-storage system operatively connected to the engine and to the motor-generator, and wherein the fuel-off actuation arrangement being selected for the intake valve increases amount of energy recovered by the motor-generator to recharge the energy-storage system during vehicle deceleration.

19. The vehicle of claim 14, wherein the mechanism includes:
a camshaft having a first cam lobe and a second cam lobe;
a rocker arm having a first surface configured to actuate the intake valve via the first cam lobe and generate a first valve lift profile and a second surface configured to actuate the intake valve via the second cam lobe and generate a second valve lift profile;
a device configured to select one of the first and second surfaces of the rocker arm to actuate the intake valve; and
a phaser configured to select a predetermined fuel-off position for the camshaft when the supply of fuel to the engine has been ceased;
wherein:
the first lift profile is lower than the second lift profile; and the fuel-off actuation arrangement for the intake valve is selected by rotating the camshaft to the fuel-off position and selecting the first cam lobe.

20. The vehicle of claim 14, further comprising a brake pedal, and wherein the controller is additionally configured to monitor a position of the brake pedal to determine whether the deceleration of the vehicle is desired and to operate the mechanism to select a fuel-on actuation arrangement for the intake valve when the brake pedal is released.

* * * * *